(12) United States Patent
Fang et al.

(10) Patent No.: US 8,462,849 B2
(45) Date of Patent: Jun. 11, 2013

(54) REFERENCE PICTURE SELECTION FOR SUB-PIXEL MOTION ESTIMATION

(75) Inventors: Xue Fang, San Diego, CA (US); Ajay Luthra, San Diego, CA (US); Limin Wang, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 951 days.

(21) Appl. No.: 12/342,223

(22) Filed: Dec. 23, 2008

(65) Prior Publication Data

US 2010/0158120 A1 Jun. 24, 2010

(51) Int. Cl.
*H04N 7/12* (2006.01)

(52) U.S. Cl.
USPC .................. 375/240.15; 375/240.24

(58) Field of Classification Search
None
See application file for complete search history.

(56) References Cited

U.S. PATENT DOCUMENTS

| | | | | |
|---|---|---|---|---|
| 2005/0013365 A1* | 1/2005 | Mukerjee et al. | ........ | 375/240.16 |
| 2005/0207496 A1* | 9/2005 | Komiya et al. | .......... | 375/240.16 |
| 2005/0276331 A1* | 12/2005 | Lee et al. | ................. | 375/240.17 |
| 2007/0237226 A1* | 10/2007 | Regunathan et al. | .... | 375/240.12 |
| 2007/0237232 A1* | 10/2007 | Chang et al. | ............. | 375/240.16 |
| 2009/0022228 A1* | 1/2009 | Wang et al. | ................. | 375/240.24 |
| 2009/0080525 A1* | 3/2009 | Haskell et al. | ........... | 375/240.16 |

OTHER PUBLICATIONS

Tourapis, Alexis Michael, H.264/MPEG-4 AVC Reference Software Manual, Jun. 29-Jul. 5, 2007, Geneva.

Lim, Keng-Pang, Text Description of Joint Model Reference Encoding Methods and Decoding Concealment Methods, Mar. 2004, Munich, Germany.

T. Wiegand, X. Zhang, and B. Girod, "Long-Term Memory Motion-Compensated Predition,", IEEE Transactions on Circuits and Systems for Video Technology, vol. 9, No. 1, pp. 70-84, Feb. 1999.

T. Wiegand, X. Zhang, and B. Girod, "Block-Based Hybrid Video Coding Using Motion-Compensated Long-Term Memory Predition", in Proceedings of the Picture Coding Symposium, Berlin, Germany, Sep. 1997, pp. 152-158.

ITU-T, Recommendation H.263 (Video Coding for Low Bitrate Communication) Annex U, 1999.

Thomas Wedi and Hans Georg Musmann, "Motion- and Aliasing-Compensated Prediction for Hybrid Video Coding". IEEE Transactions on Circuits and Systems for Video Technology, vol. 13, No. 7, pp. 577-586, Jul. 2003.

Thomas Wiegand, Gary J. Sullivan, Gisle Bjontegaard and Ajay Luthra, "Overview of the H.264/AVC Video Coding Standard", IEEE Transactions on Circuits and Systems for Video Technology, vol. 13, No. 7, pp. 560-576, Jul. 2003.

Li, Xiang, et al., "Fast Multi-Frmae Motion Estimation Algorithm With Adaptive Search Strategies in H.264", International Conference on Acoustics, Speech, and Signal Processing, IEEE, May 2004.

Ozbek, Nukhet, et al., "Fast Multi-Frame Reference Video Encoding With Key Frames", European Signal Processing Conference (EUSIPCO), Sep. 2005.

\* cited by examiner

*Primary Examiner* — Kaveh Abrishamkar
(74) *Attorney, Agent, or Firm* — Susan R. Payne (57) ABSTRACT

A video coding system includes a prediction module configured to perform multi-reference picture sub-pixel motion estimation. Reference pictures are selected for the sub-pixel motion estimation based on full-pixel motion estimation. A cost function is used to select the reference pictures from one or more groups of reference pictures for a block in a macroblock. The cost is based on full-pixel motion estimation errors and a predicted motion vector for the block. The selected reference pictures are used for sub-pixel motion estimation to get the final motion vector for each block.

20 Claims, 6 Drawing Sheets

REFERENCE PICTURE SELECTION FOR SUB-PIXEL MOTION ESTIMATION

BACKGROUND

Multiple reference picture motion compensation and fraction pixel motion estimation, also referred to as sub-pixel or sub-pel motion estimation, are key features in the new H.264/AVC video coding standard (i.e., MPEG-4 Part 10 commonly referred to as MPEG-4). Coding may include encoding and/or decoding. Multiple reference picture motion compensation is the use of multiple reference pictures for inter picture prediction. As is known in the art, inter picture prediction is generated from motion estimation. Motion estimation is the process of obtaining the motion vector used by most video compression schemes. It uses a block of pixels in a current picture to match a block of pixels in one or more previously-coded pictures (reference pictures) and identifying those pixels and their displacement (motion vector) from their location in the reference picture to their location in the current picture. H.264/AVC uses multiple reference picture motion compensation, which allows up to 16 reference pictures (or 32 reference fields, in the case of interlaced encoding). Previous standards allowed only one reference picture for motion estimation or two reference pictures for B pictures.

Matching process between pixels in a current picture and pixels non-interpolated in reference pictures is performed to obtain full-pixel motion vector for each reference. Sub-pixel motion estimation performs the search on a sub-pixel level interpolated from a full pixel in a reference picture and identifies the block in a reference picture that most closely matches a block in the current picture. H.264/AVC allows for quarter pixel motion estimation. Half-pixel motion estimation may also be performed. When searching for a block in a reference picture, sub-pixel motion estimation is normally performed around the pixels of full-pixel motion vector after the full pixel motion estimation is completed.

Multiple reference picture motion compensation and sub-pixel motion estimation used in H.264/AVC enhance the compression efficiency of video coding resulting in significant bit rate savings over MPEG-2 for the same quality of video. However, the encoding complexity of H.264/AVC increases significantly with these new features, especially when multiple references are used. For example, in some software implementations of an H.264/AVC video encoder, sub-pixel motion estimation can be the second most time consuming function of video encoding. Thus, even though multiple reference picture motion compensation and sub-pixel motion estimation increase the coding efficiency, they also increase the coding complexity. In order to reduce hardware complexity and system bandwidth, it is necessary for a video encoder system to select fewest references to go through sub-pixel motion estimation.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In some instances, well known methods and structures are not described in detail so as not to unnecessarily obscure the embodiments.

According to an embodiment, a new motion estimation procedure for encoding is disclosed that has minimal performance loss and is less complex than conventional motion estimation procedure which goes through full-pixel motion estimation, sub-pixel motion estimation and then selects the best motion vector from all the reference pictures. As a result, the motion estimation time on sub-pixel motion estimation is greatly reduced according to an embodiment. Many of the terms used herein are defined and described in the H.264/AVC standard published by the International Telecommunication Union and International Organization for Standardization (ISO), which is hereby incorporated by reference in its entirety.

The new motion estimation procedure, according to an embodiment, is operable to select a subset of reference pictures associated with their full pixel motion vector for a block, which may be less than the number of reference pictures that would be conventionally selected for full pixel motion estimation. Reference pictures along with their full pixel motion vectors are selected from a pool of available reference pictures before sub-pixel motion estimation is performed. Then, sub-pixel motion estimation is performed using the selected reference pictures and their motion vectors. In one embodiment, the reference pictures are selected based on a cost function that is a function of the sum of the absolute differences between the predicted pixels from the full pixel motion vector for a reference picture and the pixels in current picture, a difference between the full-pixel motion vector and the predicted motion vectors from a current block, and a temporal distance between the current block and a reference picture. Through testing, it has been shown that, in one of the embodiments, the method of reference picture selection described herein reduced time on sub-pixel motion estimation by 30-60% with an average bit rate increase of only 1.53%.

Figure 1:
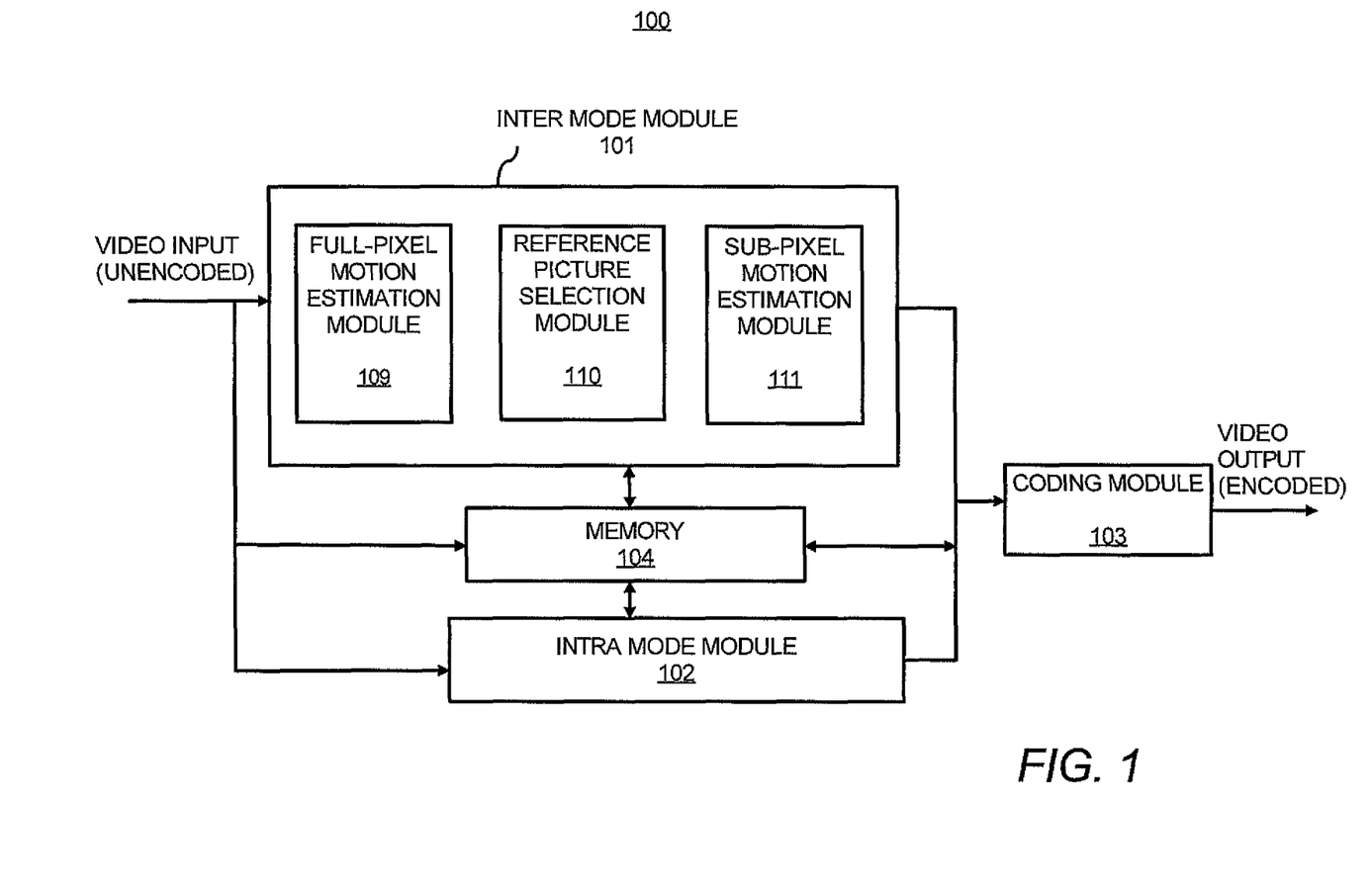
FIG. 1 illustrates a video coding system, according to an embodiment.

FIG. 1 illustrates a video coding system 100, according to an embodiment. The video coding system 100 includes an inter mode module 101, an intra mode module 102, a coding module 103, and a memory 104. Video is received by the system 100, which is shown as video input. This video includes unencoded frames which are encoded by the system 100, for example, using H.264/AVC encoding. H.264/AVC encoding uses intra prediction and inter prediction. The intra mode module 102 uses pixels in the same picture to encode other pixels in the same picture. The inter mode module 101 performs inter prediction for the current picture by using previously encoded pictures as references. Inter prediction may be performed per macro block, 16×16, or if there are blocks in a macroblock, then inter prediction is performed per block (e.g., 16×8, 8×16, 8×8, 8×4, 4×8 or 4×4).

The inter mode module 101 uses multiple reference pictures for motion estimation in accordance with H.264/AVC inter prediction. The reference pictures may include previous pictures and/or future pictures to encode the current picture. In H.264/AVC, motion estimation for B-pictures can be performed using linear combinations of forward and backward prediction pairs. Additional linear combinations (forward, forward) and (backward, backward) may also be used by using two distinct lists of reference pictures, list 0 (L0) and list 1(L1), containing short term and long term reference pictures. The default index order, based on picture order count (POC), of the pictures is as follows: L0, starts with the closest past picture and is followed by other past pictures in decreasing POC, and then future pictures in increasing POC; L1, starts with the closest future picture and is followed by other future pictures with increasing POC, and then past pictures with decreasing POC order. H.264/AVC allows up to 16 reference pictures or 32 fields for a single block.

Figure 2A:
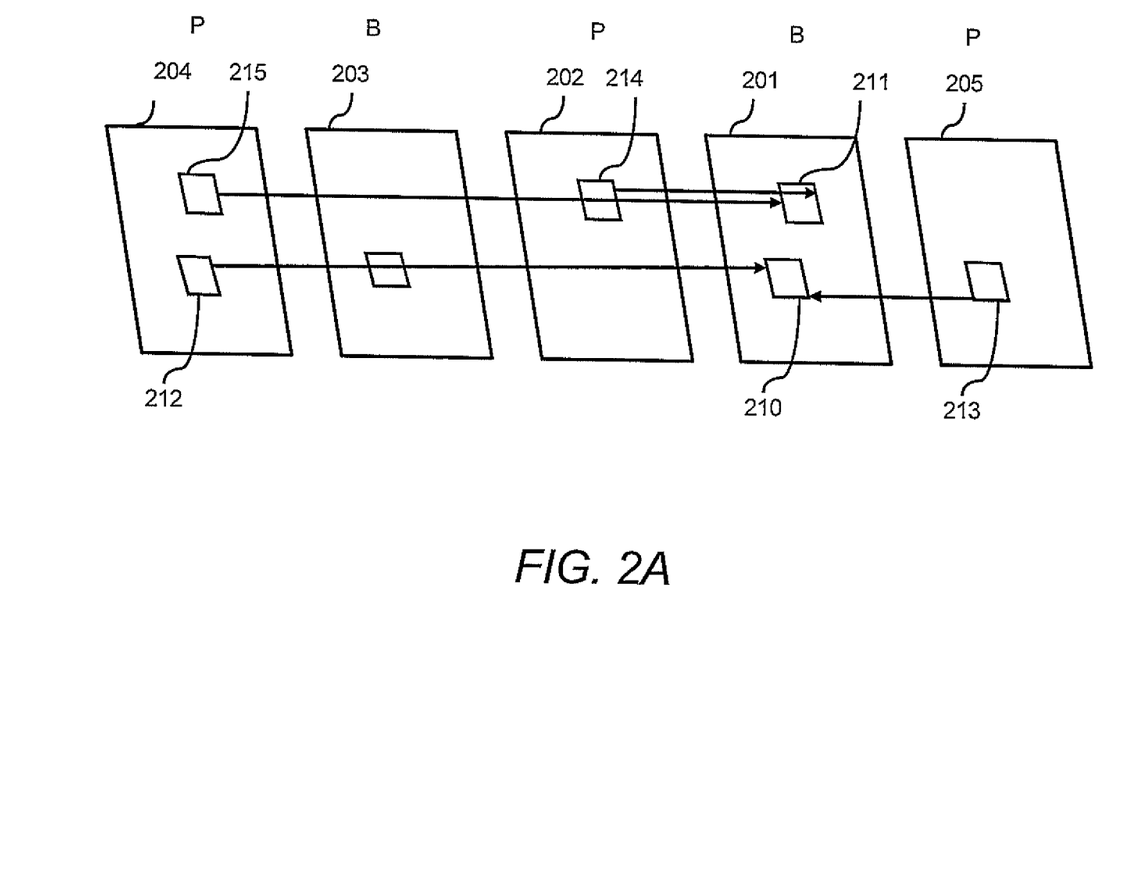
FIGS. 2A-C illustrate using multiple reference pictures for encoding, different macroblock and block sizes, and surrounding blocks for predicted motion vectors, according to embodiments.

FIG. 2A illustrates an example of using multiple reference pictures for motion estimation of macroblocks in a current picture in accordance with H.264/AVC inter prediction. The current picture 201 is a B picture. Two macroblocks, i.e., macroblock 210 and macroblock 211, are shown for the current picture 201. A linear combination of one past macroblock 212 and one future macroblock 213 are used for motion estimation of the macroblock 210. Note that FIG. 2A shows the POC for the current picture 201. Picture 202 is the closest past picture; picture 203 is the next closest past picture; and picture 204 is the next closest past picture after picture 203. Picture 205 is the closest future picture. In this example, macroblock 210 is encoded using a macroblock not from the closest past picture, but from the picture 204. Also, a macroblock from the closest future picture 205 is used. A linear combination of two past macroblocks, i.e., macroblocks 214 and 215, is used for motion estimation of the macroblock 211.

The motion vectors of motion-compensated prediction contain the spatial displacement vectors (mvx, mvy) and the time delay (reference index). Those parameters are transmitted as side information requiring additional bits.

Referring back to the inter mode module 101 shown in FIG. 1, the inter mode module 101 performs motion estimation for blocks in the current picture using multiple reference pictures in accordance with H.264/AVC. However, the inter mode module 101 selects the reference pictures according to an embodiment of the invention.

The inter mode module 101 includes a full-pixel motion estimation module 109, a reference picture selection module 110, and a sub-pixel motion estimation module 111. The full-pixel motion estimation module 109 first performs full-pixel motion estimation on all the reference pictures. The reference picture selection module 110 then selects reference pictures for encoding blocks in the current picture. A selection method is described in further detail below. The reference pictures are selected using a cost function which computes a cost for each reference picture based on full-pixel motion estimation errors and a difference (named dmv) between the full-pixel motion vector (named mv) and a predicted motion vector (named pmv), whereby pmv is determined from one or more of its neighbor blocks. For a macroblock or other size block in a macroblock, the pmv may be the motion vector of a neighbor block or a median of a plurality of motion vectors for two or more neighbor blocks to the left, the top, and/or the top right (or the top left). The motion vector of the surrounding block(s) is determined prior to determining the pmv of the currently block, but the surrounding blocks do not need to be previously encoded. Reference pictures may be selected for each block in a macroblock, wherein the block is a subset of pixels in the macroblock. A macroblock is conventionally a 16×16 group of pixels. A block is a unit of motion estimation. A block may be the same size as the macroblock, and thus one motion vector would be determined for the macroblock, or the block may be smaller in size. For example, a block may be 8×16, and then the macroblock would have two motion vectors, one for each block.

After the reference pictures are selected for the block in the current macroblock, the full-pixel motion vector and reference picture index for that block are stored. This process is repeated for all the blocks in the macroblock of the current picture. After all the blocks in the macroblock are assigned reference pictures in accordance with the reference selection process, the sub-pixel motion estimation module 111 performs sub-pixel motion estimation for each block of the current macroblock using the selected reference pictures and their motion vectors to compute the final motion vector.

The memory 104 may include a buffer for the received video, and may include memory for storing motion vectors and other data for encoding pictures.

The coding module 103 uses the motion vectors generated by the inter mode module 101 and the intra picture predictions generated by the intra picture module 102 to encode the current picture. The coding module 103 may use transforms to generate DCT coefficients and perform quantization and filtering in accordance with H.264/AVC to generate the encoded current picture. The video system 100 encodes the frames (i.e., pictures) of the video input to produce the encoded video output, which may be transmitted to other devices.

The system 100 represents a high-level representation of a video encoding system. It will be apparent to one of ordinary skill in the art that the system 100 may include more components than shown in FIG. 1 as needed to encode video.

Figure 3:
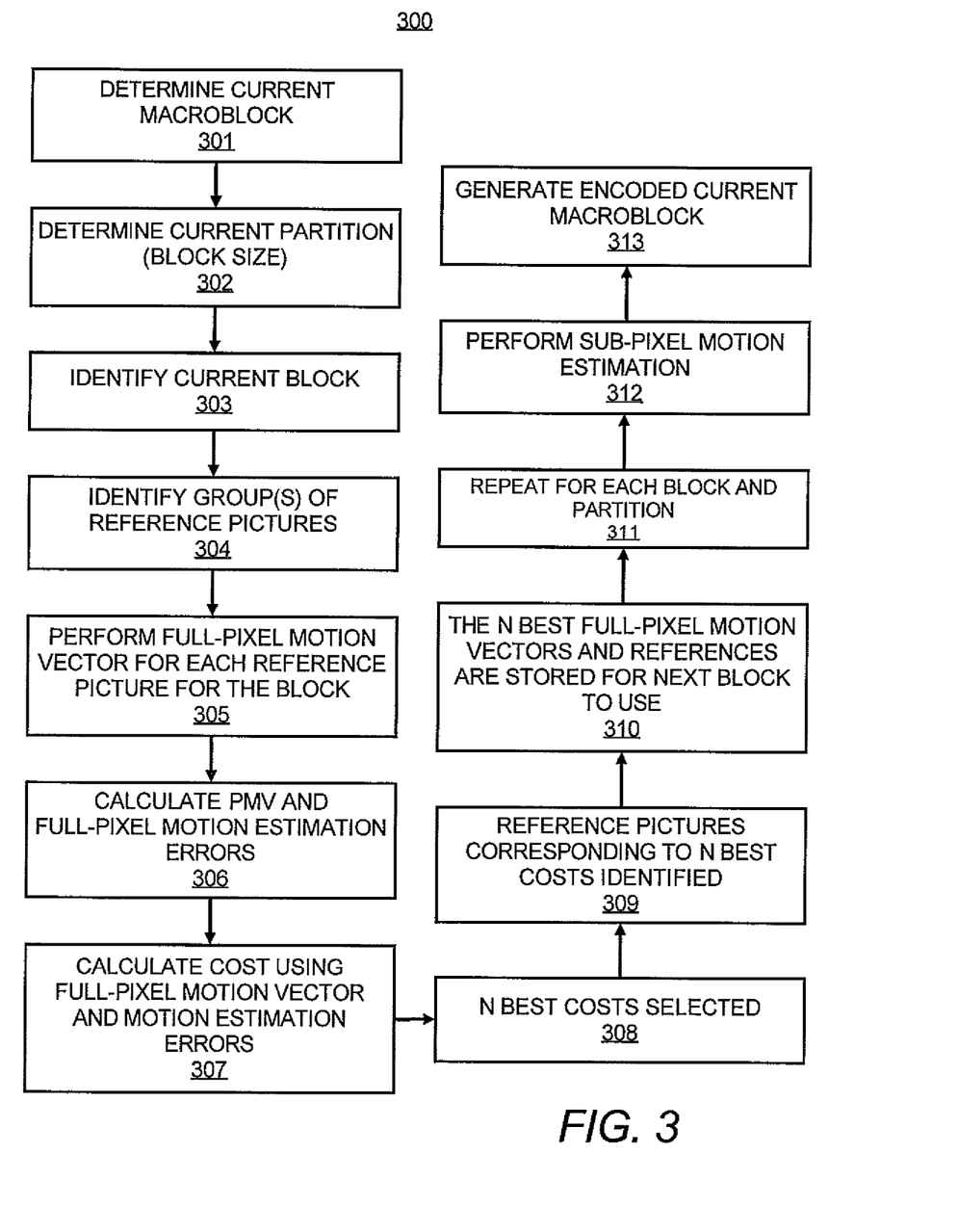
FIG. 3 illustrates a flow chart of a method of coding, according to an embodiment.

FIG. 3 illustrates a method 300 for coding video, according to an embodiment. The method 300 is described with respect to the system 100 shown in FIG. 1 by way of example and not limitation. The method may be performed in other video coding systems.

At step 301, a macroblock to be encoded from a current picture is identified. The size of the macroblock is 16×16 in H.264/AVC. All the macroblocks in the picture are the same size. Macroblock is the basic unit in a coding picture.

At step 302, the partition for the macroblock is determined. This is the block size of each block in the macroblock. The block size may be 16×16, 16×8, 8×16, 8×8. Only one block size from all the partitions will be coded for each macroblock. Block size 8×4, 4×8, and 4×4 are the sub-partitions of block size 8×8. Motion estimation is performed in the unit of a block.

Figure 2B:
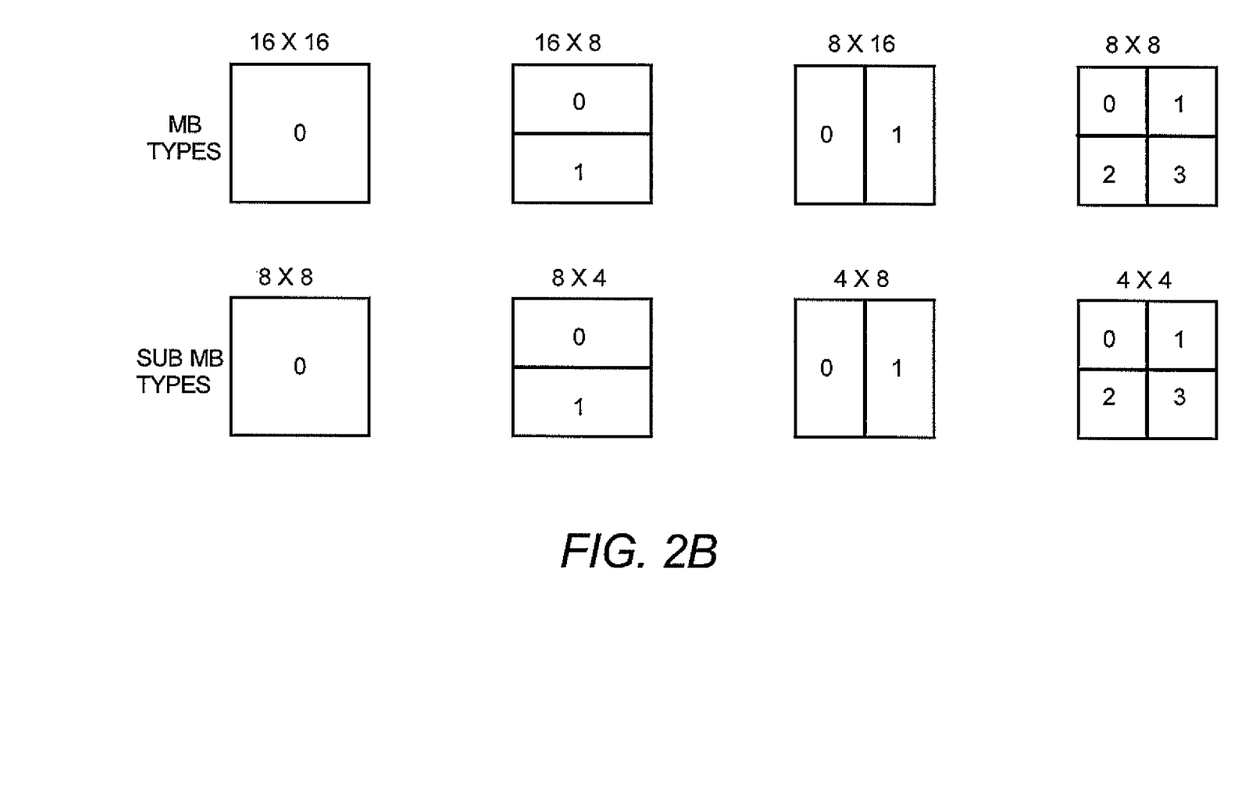

FIG. 2B shows examples of different partitions for each macroblock, labeled as MB types. FIG. 2B also shows examples of different sub-partitions, labeled as subMB types. There are 1 block for partition 16×16, 2 blocks for 16×8 or 8×16, and 4 blocks for 8×8. These blocks are indexed as shown in FIG. 2B. The same index applies to sub-partitions.

At step 303, a block in the current macroblock is identified. The block is of the size determined at step 302.

At step 304, at least one group of reference pictures is identified for the block. If the current picture is a B picture, then two groups of reference pictures are identified. One group is from list L0 (only past pictures) and one group is from list L1 (past and future pictures). If the current picture is a P picture, then one group is identified, which includes the reference pictures in the list L0 (only past pictures).

At step 305, full-pixel motion estimation is performed for each reference picture in the group(s) from step 303 for the block. A full-pixel motion vector for each reference picture is determined and stored in memory along with its reference index.

Figure 2C:
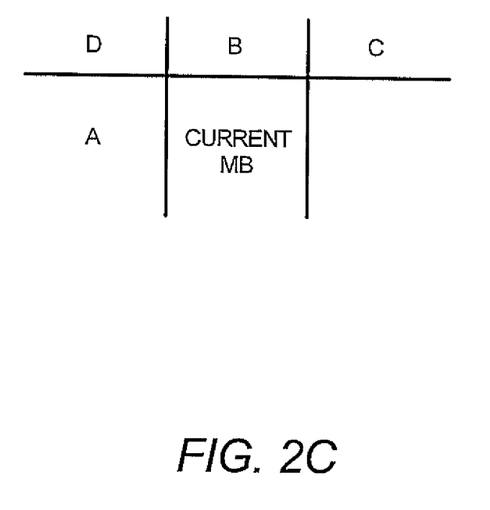

At step 306, a pmv is calculated for the block. For a block in a current macroblock, the pmv is the median of the motion vectors for surrounding blocks to the left, the top, and the top right (or the top left). The surrounding blocks (also referred to as neighbor blocks) can be within the current macroblock and/or can also be from surrounding macroblocks. FIG. 2C shows surrounding blocks A-D for the current block. The pmv may be the median of the motion vectors for one two or more of the surrounding blocks or may be the motion vector for one of the surrounding blocks.

At step 306, full-pixel motion estimation prediction errors are calculated. A prediction error is between a pixel $x_{i,j}$ in a block of the current macroblock and a pixel $\hat{x}_{i+l,j+k}$ pointed by the full-pixel motion vector (l,k) in a reference picture. For a block size (m×n), the prediction errors, named SAD is the sum of the absolute differences of those prediction errors.

$$SAD = \sum_{j=0}^{n} \sum_{i=0}^{m} |x_{i,j} - \hat{x}_{i+l,j+k}|  \quad \text{Equation (1)}$$

At step 307, a cost is calculated for each reference picture in each group identified at step 304. The cost for each reference picture is calculated for the block from step 303. Eventually, a cost for each reference picture is calculated for each block in the reference picture. A cost function is used to calculate the cost for each reference picture. The cost is based on the pmv and full-pixel motion estimation errors determined at step 306. In one embodiment, the cost function is a Lagrangian cost function as described in equation 2.

$$\text{Cost}=SAD+c*\lambda_{motion}*R(mv-pmv)+\lambda_{motion}*R(\text{refidx}) \quad \text{Equation (2)}$$

where, c is a constant that can be set to an arbitrary number, and SAD is based on a full pixel motion search discussed with respect to equation 1.

The constant c is not used by conventional cost functions. In one embodiment, as determined through experimentation, the constant c is based on the partition (block size of 16×16=1 partition, block size of 16×8 or 8×16=2 partitions, block size of 8×8=4 partitions). c may be defined as shown in equation 3:

$$C = \frac{k}{\text{partition}} \quad \text{Equation (3)}$$

where k is a constant that can be set to an arbitrary number from 1 to 32.

$\lambda_{motion}$ is a constant associated with quantization parameters and picture type obtained by using equation 4:

If (B picture)

$$\lambda_{motion}=0.68*2^{(currQP-12)/3}*\max(2,\min(4,(currQP-12)/6)); \quad \text{Equation (4)}$$

Else $$\lambda_{motion}=0.68*2^{(currQP-12)}/3$$

where CurrQP is the quantization parameter (QP) used for current macroblock quantization.

R( ) is the function used for coding bits associated with the difference of a particular choice of motion vector (mv) and its reference predicted motion vector (pmv).

$$R(dmv)=\text{floor}(\log 2(|dmv|))+3 \text{ for } |dmv|>=1, R(0)=1 \quad \text{Equation (5)}$$

Bits for coding a reference index (refidx) are computed as described in equation 5. Refidx is a reference picture identifier for each block in the reference picture.

$$R(refidx)=\text{floor}(\log 2(refidx+1))+1 \quad \text{Equation (6)}$$

Floor(x) function returns the biggest integer less than or equal to x. Log2(x) returns the based-2 logarithm of x.

At step 308, the N best costs are selected from the costs determined at step 307, where N is an integer greater than 0. The N best costs may be the N smallest costs. The number of costs selected may be predetermined. The best costs may be representative of reference pictures that have the least full pixel motion search cost.

At step 309, the reference pictures corresponding to each block of the N best costs are determined. For example, as shown in FIG. 2A, assume for block 211, that the N bests costs for all the reference pictures are costs for the reference pictures 202 and 204. Then, those reference pictures along with the full pixel motion vectors are selected for the block 211 for sub-pixel motion estimation.

At step 310, The N best full-pixel motion vectors for the corresponding selected reference pictures and reference index are stored, so that information will be used for calculating the PMV and its cost for the next block. The reference picture selection process is based on full-pixel motion vectors of surround blocks and independent to the final results (encoded partition as well as macroblock type and its subtype) so that the further sub-pixel motion estimation can be performed before the mode decision of current macroblock.

At step 311, steps 302-310 are repeated for each block of each partition in the current macroblock.

At step 312, the reference pictures are used for sub-pixel motion estimation for the current macroblock.

At step 313, the best partition or a intra mode is selected based on cost of each partition of the sub-pixel motion estimation as well as cost of intra modes for each macroblock. This step is also called mode decision. The method 300 is repeated for each macroblock of current picture for all unencoded video input to generate the encoded video output shown in FIG. 1.

Figure 4:
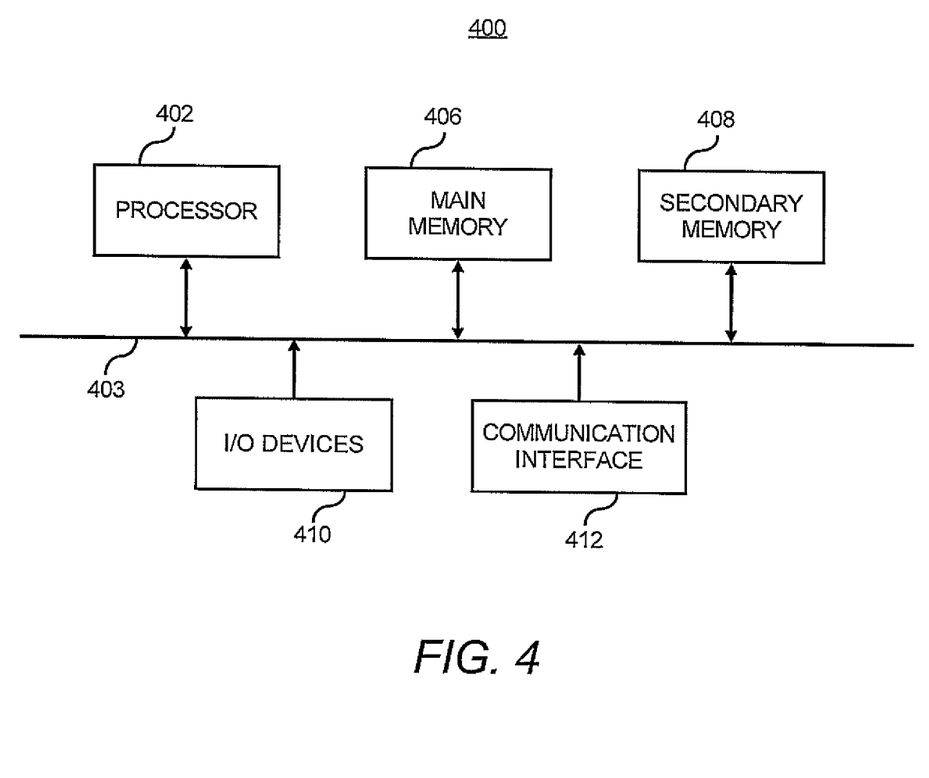
FIG. 4 illustrates a general purpose computer system, according to an embodiment.

FIG. 4 illustrates a block diagram of a general purpose computer system 400 that is operable to be used as a platform for the components of the system 100 described above. Components may be added or removed from the general purpose system 400 to provide the desired functionality.

The system 400 includes a processor 402, providing an execution platform for executing software. Commands and data from the processor 402 are communicated over a communication bus 403. The system 400 also includes a main memory 406, such as a Random Access Memory (RAM), where software may reside during runtime, and a secondary memory 408. At least some of the data storage of the memory 104 shown in FIG. 4 may be in main memory 406. The secondary memory 408 may include, for example, a nonvolatile memory where a copy of software is stored. In one example, the secondary memory 408 also includes ROM (read only memory), EPROM (erasable, programmable ROM), EEPROM (electrically erasable, programmable ROM).

The system 400 includes I/O devices 410. The I/O devices may include a display and/or user interfaces comprising one or more I/O devices 410, such as a keyboard, a mouse, a stylus, speaker, and the like. A communication interface 412 is provided for communicating with other components. The communication interface 412 may be a wired or a wireless interface. The communication interface 412 may be a network interface.

One or more of the steps in the method 300 and other steps described herein are operable to be implemented as software stored on a computer readable medium, such as the memory 406 and/or 408, and executed on the system 400, for example, by the processor 402. Also, the modules of FIG. 1 may be software stored on a computer readable medium.

The steps are operable to be embodied by a computer program, which can exist in a variety of forms both active and inactive. For example, they exist as software program(s) comprised of program instructions in source code, object code, executable code or other formats for performing some of the steps. Examples of suitable computer readable storage devices include conventional computer system RAM (random access memory), ROM (read only memory), EPROM (erasable, programmable ROM), EEPROM (electrically erasable, programmable ROM), and magnetic or optical disks.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A video coding system comprising:
   a prediction module configured to perform multi-reference picture motion estimation, the prediction module including
      a first motion estimation module configured to perform full-pixel motion estimation for a current block in a macroblock using at least one group of reference pictures;
      a reference picture selection module configured to select, for the current block, reference pictures from the at least one group of reference pictures based on a cost computed for each reference picture in the at least one group, wherein the cost is based on full-pixel motion estimation;
      a second motion estimation module configured to perform sub-pixel motion estimation for the current block using the reference pictures selected by the reference picture selection module; and
      a coding module configured to generate a coded current macroblock for the current picture using the sub-pixel motion estimation.

2. The video coding system of claim 1, wherein the cost for the current block is based on a full-pixel motion estimation errors, a full-pixel motion vector for the current block, a predicted motion vector for the current block, and a reference picture index.

3. The video coding system of claim 2, wherein $$c = \frac{k}{partition}$$

and the partition is 1 for a block size of 16×16, the partition is 2 for a block size of 16×8 or 8×16, and the partition is 4 for a block size of 8×8 and below, and wherein k is a constant set to an arbitrary number in the range of 1-32.

4. The video coding system of claim 1, wherein the motion estimation module performs sub-pixel motion estimation for each block using the reference pictures selected for the block.

5. The video coding system of claim 1, wherein the coding module is configured to determine the transform coefficients for the current picture and perform quantization to generate the coded current picture.

6. The video coding system of claim 1, wherein the cost is equal to SAD+c*λmotion*R(mv−pmv)+λmotion*R(refidx), where SAD is sum of full-pixel motion estimation errors, my is a full-pixel motion vector for the current block, pmv is a predicted motion vector (pmv) for the current block, λmotion is a constant associated with quantization parameters and picture type, R(mv−pmv) is a function for coding bits associated with a difference of a particular choice of the full-pixel motion vector (my) and the pmv, R(refIdx) is a function for coding bits associated with reference picture, and c is a constant allowing different weighting to R(mv−pmv) and R(refIdx).

7. The video coding system of claim 1, wherein the at least one group of reference pictures comprises at least one of a group of reference pictures in list L(0) and a group of reference pictures in list L(1).

8. A video coding method comprising:
   identifying at least one group of reference pictures to code a current P or B picture;
   for each reference picture in the at least one group of reference pictures,
      determining a predicted motion vector for a current block of a current macoblock in the current P or B picture; and
      determining a cost of a full pixel motion vector using the predicted motion vector; and
   selecting at least one reference picture for the current block if in the current P picture and at least two reference pictures for the current block if in the current B picture from the at least one group based on the determined cost for each reference picture in the at least one group of reference pictures.

9. The method of claim 8, further comprising:
   using the at least one or the at least two selected reference pictures for sub-pixel motion estimation for the current block in the current picture; and
   generating an encoded current picture using the sub-pixel motion estimation.

10. The method of claim 8, wherein selecting at least one reference picture for the current block if in the current P picture comprises:
    selecting the at least one reference picture having the lowest cost.

11. The method of claim 8, wherein selecting at least two reference pictures for the current block if in the current B picture comprises:
    selecting the at least two reference pictures having the two lowest costs.

12. The method of claim 11, wherein the block in terms of pixels is one of 16×16, 16×8, 8×16, 8×8, 8×4, 4×8 and 4×4.

13. The method of claim 8, wherein the cost is based on a full-pixel motion estimation errors, a full-pixel motion vector for the current block, a predicted motion vector for the current block, and a reference picture index.

14. The method of claim 8, wherein the at least one group of reference pictures comprises at least one of a group of reference pictures in list L(0) and a group of reference pictures in list L(1).

15. A non-transitory computer readable medium upon which is embedded programmed instructions which when executed by a processor or other processing circuitry perform a video coding method comprising:
    identifying at least one group of reference pictures to code a current P or B picture;
    for each reference picture in the at least one group of reference pictures,
        determining a predicted motion vector for a current block of a current macoblock in the current P or B picture; and
        determining a cost of a full pixel motion vector using the predicted motion vector; and
    selecting at least one reference picture for the current block if in the current P picture and at least two reference pictures for the current block if in the current B picture from the at least one group based on the determined cost for each reference picture in the at least one group of reference pictures.

16. The non-transitory computer readable medium of claim 15, wherein the method further comprises:
    using the at least one or the at least two selected reference pictures for sub-pixel motion estimation for the current block in the current picture; and
    generating an encoded current picture using the sub-pixel motion estimation.

17. The non-transitory computer readable medium of claim 15, wherein selecting at least one reference picture for the current block if in the current P picture comprises:
    selecting the at least one reference picture having the lowest cost.

18. The non-transitory computer readable medium of claim 15, wherein selecting at least two reference pictures for the current block if in the current B picture comprises:
    selecting the at least two reference pictures having the two lowest costs.

19. The non-transitory computer readable medium of claim 18, wherein the block partition in terms of pixels is one of 16×16, 16×8, 8×16, 8×8, 8×4, 4×8 and 4×4.

20. The non-transitory computer readable medium of claim 15, wherein the cost is based on a full-pixel motion estimation errors, a full-pixel motion vector for the current block, a predicted motion vector for the current block, and a reference picture index.

\* \* \* \* \*